Sept. 2, 1958      R. N. CLIFTON      2,850,068
ANTI-SKID PATCH FOR TIRES

Filed Jan. 20, 1955      2 Sheets-Sheet 1

INVENTOR.
RICHARD N. CLIFTON
BY Leigh W. Wright.
ATTORNEY

Sept. 2, 1958 R. N. CLIFTON 2,850,068
ANTI-SKID PATCH FOR TIRES
Filed Jan. 20, 1955 2 Sheets-Sheet 2

INVENTOR.
RICHARD N. CLIFTON
BY *Leigh N. Wright*
ATTORNEY

United States Patent Office

2,850,068
Patented Sept. 2, 1958

2,850,068

ANTI-SKID PATCH FOR TIRES

Richard N. Clifton, Cincinnati, Ohio

Application January 20, 1955, Serial No. 483,004

10 Claims. (Cl. 152—222)

This invention relates to anti-skid devices for automobile tires and the like.

It is well known that the normal tread surface of an automobile tire is sufficiently effective for tractive purposes during most of the year to prevent skidding, but in the winter time, when roads and streets become slippery from ice or a layer of snow, the normal tread surface has been found inadequate in developing the necessary traction to cope with such conditions. Thus anti-skid devices have been devised as a supplementary means to develop traction under such abnormal conditions.

One such device is the well known anti-skid chain which has a long standing as an anti-skid device. But besides being noisy in use, chains are subject to breakage because the momentary strain eventually comes on a single link of a cross chain and it is not practical to make them any heavier. The greatest objection, however, is the task of applying and removing them, and especially is it difficult, if not impossible, for women to do so, who more and more are driving cars.

Due to the difficulty of applying chains, other types of removable devices have been developed, but most of these require specially formed wheels, or attachments thereon for their application thereby limiting their use.

It is thus believed that there is a demand for a simple device of the class described which can be easily and readily applied, even by women; which is noiseless in operation; which can be conveniently stored in a small space in a vehicle for ready use; and which is extremely efficient in operation.

Therefor one of the objects of this invention is to provide a new and improved anti-skid device which satisfies such a demand.

Another object of this invention is to facilitate application by providing a device of the character described which may be easily and immediately applied to any readily accessible surface of the tire tread, not hid by present day fenders and overhanging parts, and without moving, jacking up, or crawling under the car.

A further object of this invention is to provide a device which is inexpensive to manufacture and therefor may be disposable after use.

Since many prior devices are so designed that the entire load is momentarily applied at a single point or element such has a cross link, hook or other connection which is susceptible of breakage, another important object of this invention is to provide a device which is so contrived that it may be cemented to the tire over a wide attachment area so that there is no critical point of stress or breakage and the connection may be made as strong as necessary.

A more specific object of this invention is to provide an antiskid patch of new and improved construction which is so applied to the tire that the weight of the vehicle automatically strengthens the connection at the moment of greatest pulling stress on the patch.

Other objects and advantages of the present invention will be readily apparent from the following specification considered in conjunction with the accompanying drawings forming a part hereof, but it will be understood that any modifications may be made in the exact structural details there shown and described, within the scope of the appended claims, without departing from or exceeding the spirit of the invention.

Referring to the drawings in which like reference numerals indicate like or similar parts:

In the practice and application of this invention it is intended that a patch be provided having an highly effective anti-skid surface on one side, and an attaching surface on the other side of large area which is glued, cemented or otherwise adhesively attached to the tread surface of a tire, the size of said area being made relatively large so that the shearing pull per unit of area is kept relatively small and there is no critical point of attachment to break.

Since it is intended that two or more of these patches be applied to each tire, the necessary number may be assembled in a kit which may be conveniently stored in a small space in the automobile. It is understood of course that any number of patches may be provided in the kit, but I have found that two patches applied to each rear tire placed approximately 180 degrees apart are sufficient for the most severe conditions, and thus a packet of four or even six has been found to be very suitable and satisfactory.

Figures 1, 2, 3:
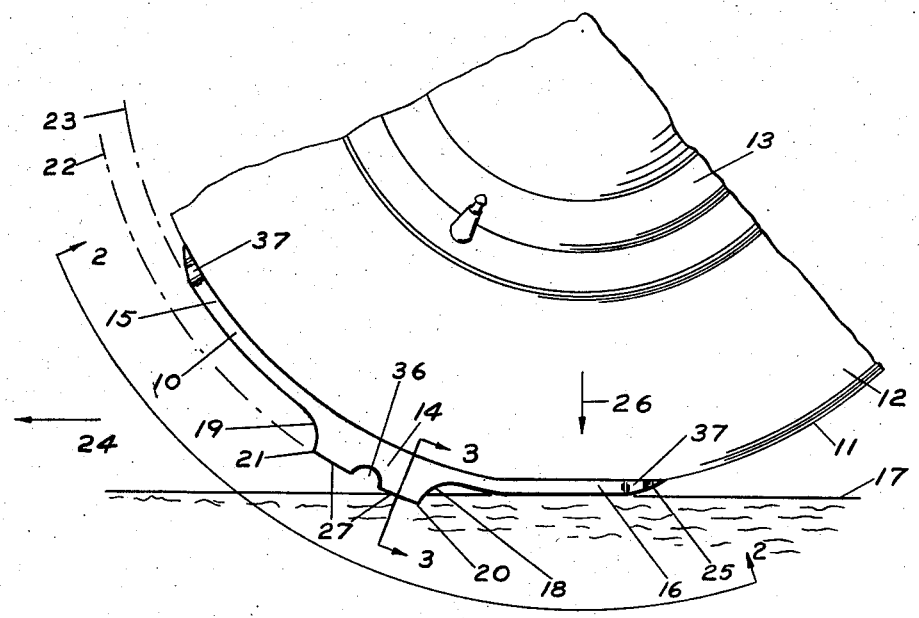
Figure 1 is an elevational view showing the application of this invention to an automobile tire.
Figure 2 is a view on the line 2—2 of Figure 1.
Figure 3 is a sectional view on the line 3—3 of Figure 1.

The anti-skid patch of this invention comprises primarily an elongated base member, indicated generally by the reference numeral 10 in Figure 1, and adapted for attachment to the tread circumference 11 of the supporting tire 12 mounted on the wheel 13. The base member 10 has a width substantially equal to the width of the tread 11 of the tire as shown in Figure 2. The member 10 has three principal parts or portions; an intermediate lug portion 14 and end tab portions 15 and 16. The minimum length of these portions measured circumferentially is approximately equal to the normal length of contact between a tire and the ground 17 under normal load conditions which is approximately four or five inches. Although the lug portion 14 is shown as molded integrally with the base member 10, it could be made separately and attached to the base member without departing from the principles of this invention.

The lug 14 is preferably made several times as thick as the tab portions to provide substantial shoulder faces, such as 18 and 19 at each end of the lug 14, the faces terminating in scraping edges 20 and 21. Each shoulder face terminating in a scraping edge acts like a hoe digging into compact material as the wheel turns, thus developing resisting force to prevent further movement of the hoe. It will thus be seen that the more it digs in and the larger the face area, the greater the resisting force, which by this invention is transformed into driving force. Also the larger the face area, the less the pressure per unit of area, because the total driving force to move a vehicle is substantially constant.

The edges 20 and 21, it will be noted from Figure 1, lie in a circumference about the wheel, as indicated by the dash and dot line 22, which has a greater radius than the tread 11 or the circumference 23 of the tab portions. The great importance of this construction is shown in Figure 1. As the tire rolls along the ground 17 in the direction of the arrow 24, it will be noted that its first rolls onto the tab portion 16, which may be beveled at its end, as indicated at 25 to facilitate this. The proportionate share of the vehicular load as indicated by the arrow 26 now rests on the tab portion 16 developing a pressure between the opposing surfaces of the tab and tread assisting to prevent shear between them. Next the edge 20 of the shoulder face 18 becomes active by engaging the surface of the road material, whatever it may be, such as ice, snow or even mud. Whether the tire continues to roll or not, the wheel will turn and the weight of the vehicle will be transferred to the line 20, causing the edge to dig into the surface of the road covering material. Even if that material has been rolled down by the preceding front tire, the shoulder will still dig below the surface because it is on a greater radius and therefore projects further from the surface of the tire. Since it would otherwise tend to raise the vehicle, it causes the entire load to be thrown onto a single line developing a greater penetrating force.

With the road covering material held compact by the tab portion 16, forming a resisting force to the hoeing action of the shoulder face 18, it will be obvious that a great pulling force will now be developed to maintain movement of the vehicle. This is more important than at first appears. If the compact material is loose snow, a high pressure per unit of area of the shoulder face might cause it to cut through the snow, while a large area at low unit pressure would not, and thus a driving force is developed.

This construction is also very effective on ice, because it is immediately apparent that the scraping edge as it hits the ice is either going to roll along or slip, but if it slips, the scraping edge is going to scrape along the surface of the ice which will produce some push, because it does not take much driving power to cause a vehicle to roll on a hard surface. On the other hand, if the wheels are locked by the brakes during movement, the scraping edge becomes effective as a brake to stop movement.

This patch must of course be securely attached to the tire, and in this invention it is connected adhesively. It is well known that there are many forms of what may be classified as glues, adhesives and cements for integrally attaching one piece of rubber to another. The main property of such a glue or cement for the purposes herein is that it be waterproof and prevent shear between the patch and the tire under working conditions. All such material will be included herein under the term cement. The cementing material may be applied to the attaching surfaces in different ways, such as in a fluid or semi-fluid state at the time of attachment, or it may be preapplied to the attaching surface of the patch as in the case of the well known gummed surfaces.

In practice, any available exposed surface of the tire tread is selected, that is, any area unobstructed by fenders or other impedimenta. The selected tread surface is cleaned of dirt or other foreign material in the well known manner, and the patch is applied to this cleaned area cemented thereon. It may be suitably pressed thereon by simply rolling the vehicle on to it to insure integral attachment to the tire. The cement therefore constitutes means for attaching the patch to the tire tread and effecting tenacious gripping between the surfaces.

The total resistance to shear of the cemented area is of course dependent upon the extent of the attaching area and the strength of attachment per unit of that area. This total force should be greater than the pull exerted by the shoulder area, it being kept in mind that the tire per se and its share of the vehicle load is entirely resting on the patch, thus utilizing the entire area of the cemented surfaces. It will be evident that if the shoulder were held against turning by road material, that the wheel driving force would have to shear the entire cemented area in order for the wheel to turn and leave the patch in place. By this arrangement, there can be no critical point of breakage because the length of the tabs may be increased if necessary to increase the cemented area to whatever degree necessary.

However it is apparent from the description that the entire vehicular weight on a given wheel will rest on one of the tabs to increase the compression on the cemented area and thus materially increase the shear strength and just at the time when the shear force is the greatest. That is, when the scraping edge first becomes active and effective in contacting the road surface.

It is obvious that many modifications may be made in the shape, and even the material of this device. It is preferable that it be made of some form of rubber. After the circumferential surface or periphery 27 of the lug portion 14 has rolled on to the ground, it is of course momentarily like any other tire surface and may be provided on its periphery with any of the conventional tire tread designs if desired. But these would not be any more effective in this position than in their normal position on the periphery of the tire. Some slight increase in efficiency might be gained by providing some form of spurs projecting from the surface and these are not considered a departure from this invention.

Figure 4:
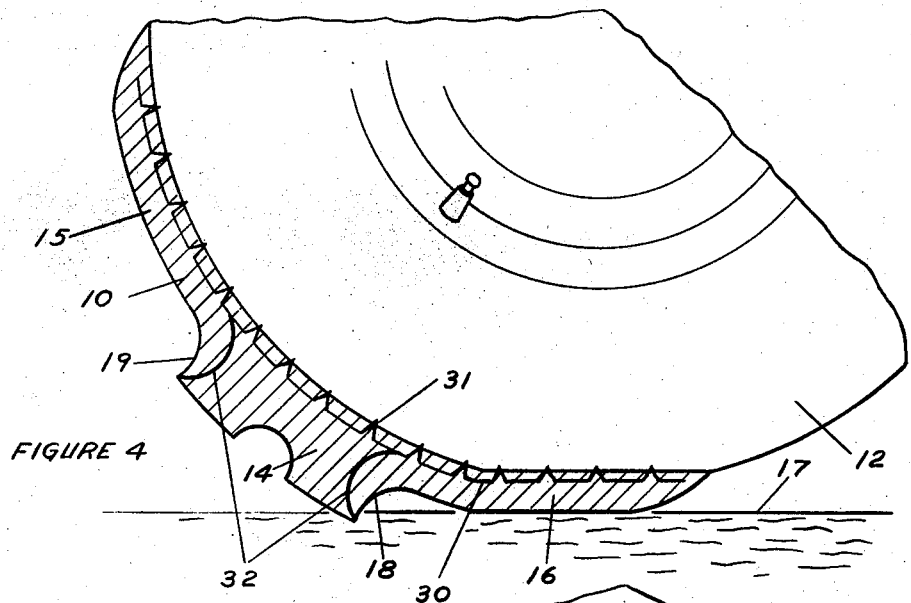
Figure 4 is an elevational view showing a modified form of this invention.

It is contemplated within the scope of this invention that the patch may be reinforced to add stiffness thereto and especially the lug portion. If the patch is made of a solid block of rubber-like material it may be sufficiently rigid but for severe conditions it can be reinforced. One form of reinforcement may be the equivalent of a coiled spring 28 vulcanized in the lug portion as shown in Figure 3 with a slight portion of the wire 29 protruding from the surface. Again metallic inserts 30 in the form of strip steel shown in Figure 4, may also be vulcanized or otherwise embedded in the patch when made. These inserts may have spurs 31 punched or otherwise indented therein, which will project beyond the attaching surface of the patch to imbed moderately in the surface of the tire without injuring the same.

By making the inserts of strip steel, and extending them longitudinally of the device they will be subject to tension under load conditions and thereby strengthen the device. Curled hooks 32 may be formed as part of insert 30 to provide hard steel edges at 20 and 21 in addition to reinforcing the lugs.

Figure 5:
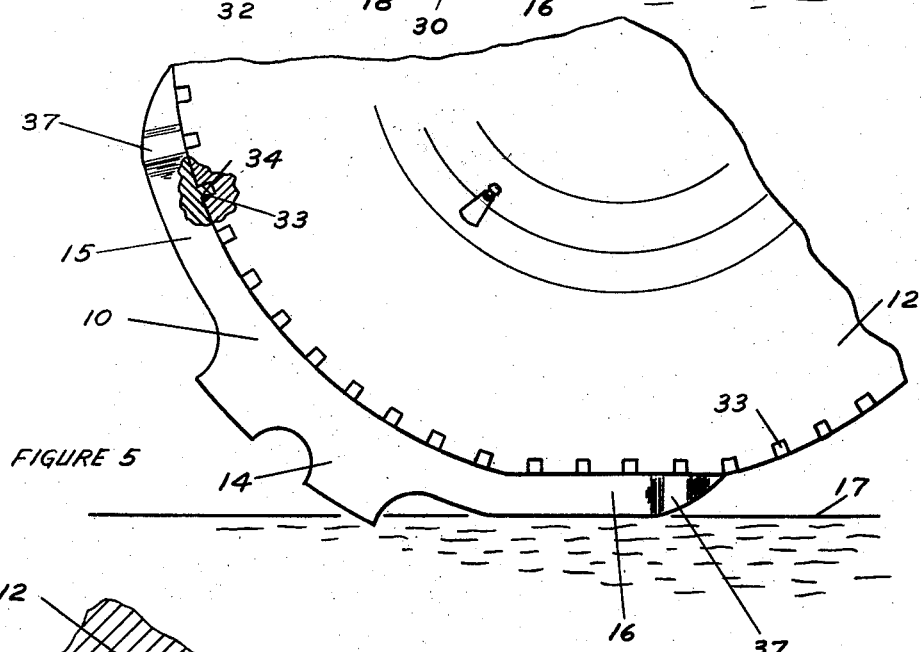
Figure 5 is an elevational view showing another modification of this invention.

In the case of a popular tire, that is sold in large quantities and has a standard tread design, such as the diamond shaped pockets shown at 33 in Figure 2, which are formed in intaglio, the patch may be specially designed to suit these tires by embossing the attaching surface of the patch with diamond shaped protuberances 34 which fit into the corresponding pockets 33 in the tire when attached, as shown in Figure 5. This arrangement provides a sort of mechanical interlock connection to supplement the cemented connection.

Figure 6:
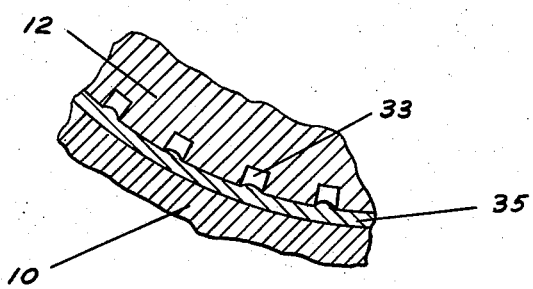
Figure 6 is a detail view of a modification of the invention.

As an alternative to this arrangement, and to add universality to the device the attaching face of the patch may be provided with a soft rubber facing 35 as shown in Figure 6 which will automatically embed in the interstices 33 in the tire tread under load of the vehicle, and thus automatically interlock each time the patch is under load.

In some cases the lug may be broken up to form two or more shoulders but the space or groove 36 between them must be made generous and effective to allow road material to pack therein to make the shoulder faces effective, or otherwise only the scraping edges are effective. When the lug 14 is broken up, the need for reinforcement then becomes more important.

Since the patch is a temporary device, and therefor should be removable, the corners of the patch are provided with nibs 37 which may be gripped with a pair of pliers or other suitable tool to peel the patch off of the tire.

There has thus been provided a new and improved antiskid device for the purposes disclosed comprising a main body made up of a lug portion and end tab portions, and of a width substantially equal to the width of a tire tread, in which the lug portion is several times as thick as the tab portions to provide one or more scraping edges and shoulder faces; and in which the lug portions may be reinforced by suitable rigid inserts embedded therein.

This device is also designed that the vehicular weight on one wheel will rest on the tab portion before the scraping edge becomes active as a gripping and pressure agent and thus will automatically reinforce the connection between the patch and tire. It will also be noticed that a device has been provided which may be easily and quickly applied to the surface of a normal tire by simply wiping clean an available area, and cementing and pressing the patch in position on that area, which can readily be done without jacking up the car or crawling under it.

What I claim is:

1. An anti-skid attachment for the tire of a rotatable wheel of an automobile, comprising a nonmetallic member elongated in the direction of the periphery of the tire, and coextensive with its width, said member being adapted to be attached by cementing to the periphery of the tire for rotation therewith, said member having a leading thin portion upon which the tire will roll first as it rotates, and a following thicker portion forming a shoulder substantially perpendicular to the tire surface and terminating in a scraping edge extending transversely of the tire, whereby when the edge becomes active by engagement with the ground, the tire will be supported on said leading portion.

2. An anti-skid patch for attachment lengthwise of the tread of an automobile tire comprising an elongated nonmetallic member having beveled ends, said member having a width substantially equal to the tread portion of the tire, the material of the inner surface of said members being adaptable to retain a coating of cement, said member being divided lengthwise into end tab portions and an intermediate lug portion, said lug portion having a greater thickness than the tab portions to form end shoulders, the faces of which are substantially perpendicular to the tread to form pressure faces, one of which is effective during one direction of tire rotation and the other of which is effective during the other direction of tire rotation, said faces terminating in scraping edges extending transversely of the tire, said tab portions having a length sufficient to support the tire.

3. An anti-skid patch for an automobile tire tread comprising an elongated non-metallic member having beveled ends, and a width substantially equal to said tread, the material of the inner surface of said member being adaptable to absorb a coating of cement, said member being divided lengthwise into end tab portions and an intermediate lug portion, said lug portion having a substantially greater thickness than the tab portions to form end shoulders, metallic reinforcing means embedded in said lug portion, the faces of said shoulders lying perpendicular to the tread to form pressure faces, one of which is effective during one direction of tire rotation and the other of which is effective during the other direction of tire rotation, said faces terminating in scraping edges extending transversely of the tire, said tab portions having a length sufficient to completely support the tire and laterally projecting nibs formed on the corners of said tab portions for stripping the patch from the tire.

4. An anti-skid patch for attachment lengthwise of an automobile tire tread comprising an elongated non-metallic member having beveled ends, and a width substantially equal to said tread, the material of the inner surface of said member being adaptable to absorb a coating of cement to effect tenacious gripping of the opposed surfaces of said member and tread throughout their area of contact to effect and maintain attachment of the patch, said member being composed of end tab portions and an intermediate lug portion, said lug portion having a substantially greater thickness than the tab portions to form shoulders, metallic reinforcing means embedded in said lug portion, the oppositely facing shoulders being perpendicular to the tread to form pressure faces, one of which is effective during one direction of tire rotation, and the other effective during the other direction of tire rotation, said faces terminating in scraping edges extending transversely of the tire, and said tab portions having a sufficient length to support the tire when the faces are active.

5. An anti-skid patch for attachment lengthwise of an automobile tire tread or the like, comprising an elongated member having beveled ends and a width substantially equal to the tread portion of the tire, the inner surface of said member having a soft rubber face, said member comprising end tab portions and an intermediate lug portion of relatively greater thickness than the tab portions to form end shoulders perpendicular to the tread, the face of one shoulder being effective during one direction of tire rotation, and the other face effective during the other direction of tire rotation, the edges of said shoulders constituting scraping edges extending transversely of the tire, and said tab portions having a length sufficient to completely support the tire when either face and edge become active.

6. An anti-skid patch for emergency cementation to an exposed peripheral surface of a tire in situ on a vehicle, comprising an elongated flexible base member one surface of which is adapted to be applied to a cleaned portion of said exposed surface, the opposite surface of said base member having formed therewith intermediate the length thereof an outstanding lug portion forming end pressure faces lying in substantially radial planes of said tire, the radial height of said faces being several times the thickness of said base member to form faces of substantial area terminating in peripheral scraping edges, the extent of said member in each direction beyond said lug portion forming tab portions of sufficient length that the tire may rest thereon when said scraping edges hit the ground during rotation of the tire.

7. An anti-skid patch for attachment lengthwise of the tread of an automobile tire or the like comprising an elongated non-metallic member, substantially equal to the width of the tread, having an inner surface adaptable for cementing to the exterior surface of the tread, said member being divided lengthwise into end tab portions and an intermediate lug portion, said lug portion being thicker than the tab portions to form end shoulders, the faces of which are substantially perpendicular to the tread to form pressure surfaces, said surfaces terminating in scraping edges extending transversely of said tread, each tab portion having a length sufficient to completely support the tire when the adjacent scraping edge becomes active.

8. An anti-skid patch for tire treads comprising an elongated base member having an inner surface, said member having tab portions of sufficient length to wholly support the tire and an intermediate lug portion connecting said tab portions and of greater thickness than said tab portions to form end shoulders substantially perpendicular to said tread, the faces of said shoulders terminating in scraping edges extending transversely of the tire.

9. An anti-skid patch for attachment to the tread of an automobile tire comprising a non-metallic member elongated in the direction of the periphery of the tire, and as wide as the tread, said member having tab portions at each end of prescribed thickness and length to completely support the tire, and an intermediate lug portion connecting said tab portions, said lug portion being thicker than said tab portions to form shoulders having faces substantially perpendicular to said tread and terminating in scraping edges, the periphery of the lug portion lying in a circumference of greater radius than the circumference of said tab portions.

10. An anti-skid patch for attachment to the tread of a rotatable tire comprising a flexible base member having an inner surface adapted to retain a coating of cementitious material for cohesive attachment to said tread, said surface constituting the sole attaching surface of said member, said member having sufficient area and thickness to separate the tire from the surface being traversed when rotatably interposed therebetween whereby the pressure resulting from said interposition is adapted to aid said cohesive attachment, said member having lug portion means externally protruding therefrom intermediate its length, said means providing transversely extending substantially right angular scraping edge means, some of which are more active during one direction than the other direction of tire rotation.

References Cited in the file of this patent

UNITED STATES PATENTS

| | | |
|---|---|---|
| 906,304 | Saunders | Dec. 8, 1908 |
| 969,908 | Russell | Sept. 13, 1910 |
| 1,872,003 | Pratt | Aug. 16, 1932 |
| 2,530,108 | Whichard | Nov. 14, 1950 |
| 2,696,238 | Jarvis | Dec. 7, 1954 |

FOREIGN PATENTS

| | | |
|---|---|---|
| 11,399 | Great Britain | June 4, 1901 |